United States Patent [19]

Patel et al.

[11] Patent Number: 5,424,284

[45] Date of Patent: * Jun. 13, 1995

[54] DRILLING FLUID ADDITIVE AND METHOD FOR INHIBITING HYDRATION

[75] Inventors: Arvind D. Patel, Houston; Henry C. McLaurine, Katy, both of Tex.

[73] Assignee: M-I Drilling Fluids Company, Houston, Tex.

[*] Notice: The portion of the term of this patent subsequent to Sep. 27, 2011 has been disclaimed.

[21] Appl. No.: 87,458

[22] Filed: Jul. 2, 1993

Related U.S. Application Data

[63] Continuation-in-part of Ser. No. 59,453, May 7, 1993, Pat. No. 5,350,740, which is a continuation-in-part of Ser. No. 866,845, Apr. 10, 1992, abandoned, which is a continuation-in-part of Ser. No. 783,368, Oct. 28, 1991, Pat. No. 5,149,690.

[51] Int. Cl.⁶ ............................................. C09K 7/02
[52] U.S. Cl. .................................................. 507/129
[58] Field of Search ........................................ 507/129

[56] References Cited

U.S. PATENT DOCUMENTS

| | | | |
|---|---|---|---|
| 3,726,796 | 4/1973 | Schweiger | 252/8.5 |
| 3,928,695 | 12/1975 | Philp et al. | 428/95 |
| 4,366,071 | 12/1982 | McLaughlin et al. | 252/8.55 |
| 4,366,072 | 12/1982 | McLaughlin et al. | 252/8.55 |
| 4,366,074 | 12/1982 | McLaughlin et al. | 252/8.55 |
| 4,374,739 | 2/1983 | McLaughlin et al. | 252/8.55 |
| 4,383,933 | 5/1983 | Jenkins | 252/329 |
| 4,605,772 | 8/1986 | Darby et al. | 564/503 |
| 4,637,883 | 1/1987 | Patel et al. | 252/8.515 |
| 4,710,586 | 12/1987 | Patel et al. | 560/68 |
| 4,713,183 | 12/1987 | Patel et al. | 252/8.515 |
| 4,767,549 | 8/1988 | McEwen et al. | 252/8.514 |

(List continued on next page.)

FOREIGN PATENT DOCUMENTS

| | | |
|---|---|---|
| 876019 | 7/1971 | Canada . |
| 1185779 | 4/1985 | Canada . |
| 0182669 | 5/1986 | European Pat. Off. . |
| 0330379 | 8/1989 | European Pat. Off. . |
| 3238394 | 4/1984 | Germany . |
| 272287A1 | 10/1989 | Germany . |
| 2164370 | 3/1986 | United Kingdom . |

(List continued on next page.)

OTHER PUBLICATIONS

M. I. Lipkes, et al., "Effect of the Addition of Quarternary Ammonium Compounds on the Properties of Water Base Clay Drilling Muds", Neft Khoz, No. 6, pp. 33–35, Russia, Jun., 1990.

T. W. Beihoffer, et al., "The Development of an Inhibitive Cationic Drilling Fluid for Slim-Hole Coring Applications", Society of Petroleum Engineers Drilling Conference Proceedings, Houston, Texas, Feb. 27–Mar. 2, 1990, pp. 341–351.

R. H. Retz, et al., "An Enviromentally Acceptable and Field —Practical, Cationic Polymer Mud System", (List continued on next page.)

*Primary Examiner*—Gary Geist
*Attorney, Agent, or Firm*—Arnold, White & Durkee

[57] ABSTRACT

This invention relates to drilling fluid additives that suppress clay swelling within a subterranean well and to methods for controlling clay swelling during the drilling of a subterranean well. In one embodiment trihydroxy alkyl amine is reacted with an alkyl halide or a water soluble quaternary amine to form a quaternized trihydroxy alkyl amine. The reaction products can also include condensed reaction products of quaternized trihydroxy alkyl amines. In another embodiment a choline derivative is used. The quaternized reaction products and choline derivatives are characterized by low toxicity and compatibility with anionic drilling fluid components. The products are added to water base drilling fluids which are circulated throughout a well. The drilling fluid additives and the method of controlling clay swelling provide for improved control of the rheological properties of drilling fluids along with increased environmental and drilling fluid compatibility.

10 Claims, No Drawings

U.S. PATENT DOCUMENTS

| | | | |
|---|---|---|---|
| 4,820,511 | 4/1989 | Hoffkes et al. | |
| 4,828,724 | 5/1989 | Davidson | 252/8.511 |
| 4,828,726 | 5/1989 | Hines et al. | 252/8.553 |
| 4,847,342 | 7/1989 | Peiffer | 526/229 |
| 4,889,645 | 12/1989 | Firth et al. | 252/8.514 |
| 4,913,585 | 4/1990 | Thompson et al. | 405/128 |
| 4,940,764 | 7/1990 | Meister | 527/400 |
| 4,990,270 | 2/1991 | Meister | 252/8.554 |
| 5,026,490 | 6/1991 | Peiffer et al. | 252/8.510 |
| 5,066,753 | 11/1991 | Peiffer | 526/310 |
| 5,097,904 | 3/1992 | Himes | 252/8.551 |
| 5,350,740 | 9/1994 | Patel et al. | |
| 5,380,706 | 1/1995 | Himes et al. | 507/129 |

FOREIGN PATENT DOCUMENTS

| | | |
|---|---|---|
| 2175291 | 11/1986 | United Kingdom . |
| 486128 | 1/1976 | U.S.S.R. . |
| 1320220 | 6/1987 | U.S.S.R. . |
| WO88/07499 | 10/1988 | WIPO . |
| WO90/07337 | 7/1990 | WIPO . |

OTHER PUBLICATIONS

Society of Petroleum Engineers Offshore Europe Conference, Aberdeen, Sep., 1991, pp. 325–336.

J. P. Tatum, "Organophilic Clays for Low-toxicity Drilling Fluids", 3rd Royal Chemicals in the Oil Industry Symposium, pp. 31–36, Manchester England, 1988.

J. P. Tatum, "Organophilic Clays", Royal Industrial Applications of Surfactants Symposium, pp. 289–306, Salford, England, 1987.

J. K. Borcharrdt, "Organic Polymer Formation Damage Control Chemicals A Review of Basic Chemistry and Field Results", Symposium on Advances in Oil Field Chemistry Presented Before the Division of Petroleum Chemistry Inc. American Chemical Society, Toronto, Canada, Jun., 1988.

B. Bajdjuk, et al., "New Methods for Determining Physico–Mechanical Properties of Rocks, in Order to Choose Drilling Fluids", Nafta, vol. 44, No. 10, pp. 261–264, Russia, Oct., 1988.

DRILLING FLUID ADDITIVE AND METHOD FOR INHIBITING HYDRATION

RELATED PATENTS AND PATENT APPLICATIONS

This application is a continuation-in-part of U.S. Ser. No. 08/059,453 filed May 7, 1993, now U.S. Pat. No. 5,350,740 which is a continuation-in-part of U.S. Ser. No. 07/866,845, filed Apr. 10, 1992, now abandoned, which is a continuation-in-part of U.S. Ser. No. 07/783,368, filed Oct. 28, 1991, now U.S. Pat. No. 5,149,690.

BACKGROUND OF THE INVENTION

The invention relates to drilling fluid additives which suppress clay swelling within a subterranean well during the drilling process. The invention is particularly directed to hydration inhibiting additives for drilling fluids comprising hydroxyalkyl quaternary ammonium compounds which are compatible with anionic polymers typically found in or added to drilling fluids and are environmentally acceptable.

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low-permeability filter cake that seals openings in formations penetrated by the bit and act to reduce the unwanted influx of formation fluids from permeable rocks.

Drilling fluids are typically classified according to their base material or primary continuous phase. In oil-base fluids, solid particles are suspended in oil, and water or brine may be emulsified with the oil. The oil is typically the continuous phase. In water-base fluids, solid particles are suspended in water or brine, and oil may be emulsified in the water. Water is the continuous phase. Oil-base fluids are generally more effective in stabilizing water-sensitive shales than water-base fluids. However, environmental concerns have limited the use of oil-base drilling fluids. Accordingly, oil drilling companies have increasingly focused on water-base fluids.

Three types of solids are usually found in water-base drilling fluids: (1) clays and organic colloids added to provide necessary viscosity and filtration properties, (2) heavy minerals whose function is to increase the drilling fluid's density, and (3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of such solids in the drilling fluid can greatly increase drilling time and costs. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or pipe sticking that can slow drilling and increase the drilling costs.

In the North Sea and the United States gulf coast areas, drillers commonly encounter argillaceous sediments in which the predominant clay mineral is montmorillonite (commonly called "gumbo shale"). Gumbo shale is notorious for its swelling. Thus, given the frequency in which gumbo shale is encountered in drilling subterranean wells, the development of a substance and method for reducing clay swelling has long been a goal of the oil and gas exploration industry.

The mechanisms of clay swelling are well known. Clay minerals are crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, and is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they can trade places with other cations when the clay crystal is in water. In addition, ions can also be adsorbed on the clay crystal edges and exchanged with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing. Two types of swelling can occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules then line up to form a quasi-crystalline structure between unit layers which results in an increased c-spacing. All types of clays swell in this manner.

Osmotic swelling is a second type of swelling. Where the concentration of cations between unit layers in a clay mineral is higher than the cation concentration in the surrounding water, water is drawn between the unit layers and the c-spacing is increased. Osmotic swelling results in larger overall volume increases than surface hydration. However, only certain clays, like sodium montmorillonite, swell in this manner.

Exchangeable cations found in clay minerals greatly impact the amount of swelling that takes place. The exchangeable cations compete with water molecules for the available reactive sites in the clay structure. Generally, cations with high valences are more strongly adsorbed than ones with low valences. Thus, clays with low valence exchangeable cations will swell more than clays whose exchangeable cations have high valences. Calcium and sodium cations are the most common exchangeable cations in gumbo shale. As the sodium cation has a low valence, it easily disperses into water, thereby giving gumbo shale its notorious swelling characteristics.

Although a number of compounds are known for their effectiveness in inhibiting reactive shale formations, several factors affect the practicality of using swelling inhibitor additives in drilling fluids. First, the inhibitor must be compatible with the other drilling fluid components. The driller of subterranean wells must be able to control the rheological properties of drilling fluids by using additives such as bentonite, anionic polymers and weighting agents. Thus, drilling fluid additives should also provide desirable results but should not inhibit the desired performance of other additives. However, many swelling inhibitors will react with other drilling fluid components, resulting in severe flocculation or precipitation.

Second, current drilling fluid components must be environmentally acceptable. As drilling operations impact on plant and animal life, drilling fluid additives should have low toxicity levels and should be easy to handle and to use to minimize the dangers of environmental pollution and harm to personnel. Moreover, in the oil and gas industry today, it is desirable that additives work both onshore and offshore and in fresh and salt water environments.

Numerous attempts have been made to improve the shale inhibition of water-base drilling fluids. One method to reduce clay swelling is to use inorganic salts in drilling fluids, such as potassium chloride and calcium chloride. Other methods examined for controlling clay swelling have centered on the use of water soluble polymers in drilling fluids. Since they adsorb on the surfaces of clays when included in drilling fluids, these polymers compete with water molecules for the reactive sites on clays and thus serve to reduce clay swelling. These polymers can be either cationic, anionic, or nonionic. Cationic polymers dissociate into organic cations and inorganic anions, while anionic polymers dissociate into inorganic cations and organic anions. Nonionic polymers do not dissociate. Cationic polymers have proven to be generally more effective shale inhibitors than either anionic or nonionic polymers.

Several cationic polymer systems for water-base fluids have been proposed. One system, a brine-base system, examined two dialkyldimethyl quaternary ammonium salts (dialkyl quats) of the following general formula:

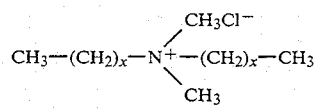

wherein x=10 or 16. Although the shorter chain dialkyl quat (x=10) was more effective in inhibiting shale than the longer chain dialkyl quat (x=16), the tests indicated that the ability of the dialkyl quats to inhibit shale appeared to be hindered by their limited solubility in water.

Another attempt examined three trimethylalkyl ammonium chlorides (mono alkyl quats) of the following general formula:

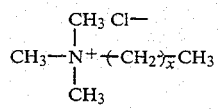

wherein x=10, 14 or 16.

The alkyl quat with the shortest chain (x=10) showed the best shale inhibition. However, drilling fluids formulated using the alkyl quat in conjunction with potassium chloride in a drilling fluid formulation generated large amounts of foam. Consequently, the three alkyl quats were judged unsuitable for use in drilling.

Based on the failure of brine-base systems employing potassium chloride and quaternary compounds, alternative cationic polymers were evaluated. Cationic polymers were again used in conjunction with potassium chloride. The brine-base system employed potassium chloride and three additional quaternized polymers having the following general formulas:

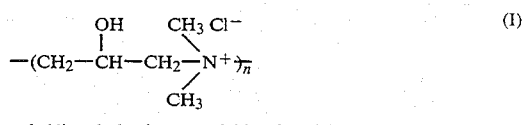

poly(dimethylamine-co-epichlorohydrin)

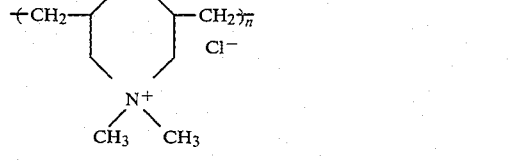

poly(N,N-dimethyl-3,5-dimethylene piperidinium chloride)

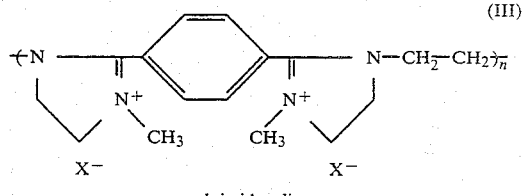

polyimidazoline

A Formula I category polymer exhibited the best shale inhibition. A drilling fluid formula was prepared using conventional viscosifiers, fluid loss additives, the shale inhibitor of formula I and potassium chloride. The cationic polymer was found to be incompatible with the conventional anionic additives, i.e., bentonite, xanthan gum, carboxymethylcellulose (CMC), polyacrylates, etc. A non-ionic viscosifier, hydroxyethylcellulose, and a non-ionic fluid loss agent, pregelatinized starch, were used as substitutes to overcome the incompatibility problem. Further details regarding the brine-base systems described above are reported in Beihoffer et al., "The Development of an Inhibitive Cationic Drilling Fluid for Slim-Hole Coring Applications," SPE-19953 presented at the 1990 SPE/IADC Drilling Conference held in Houston, Feb. 27–Mar. 2, 1990, the subject matter of which is incorporated herein by reference.

Although the described cationic polymers are effective shale inhibitors, the incompatibility of the polymers with common anionic drilling fluid additives is a disadvantage. Moreover, these cationic polymers are toxic. Since environmental concerns are of ever increasing importance, a search for compatible cationic polymers having low toxicity has resulted.

One effort identified two cationic polymers having low toxicity and good shale inhibition when used together. The first polymer is a high molecular weight cationic polyacrylamide. The second polymer is a quaternary polyamine. In the drilling fluid formulation, the high molecular weight polyacrylamide was used for shale encapsulation, and the low molecular weight polyamine was used for swelling suppression. Although the two polymers had low toxicity, they were totally incompatible with anionic polymers in fresh water. Adding salts, such as sodium chloride, to increase the ionic concentration, alleviated the precipitation problem. However, the polymers also caused flocculation of the bentonite component of the drilling fluid. This problem was corrected by adding polyvinyl alcohol to the formulation as a deflocculant. Additional details of the described system, including toxicity tests and additional background on water adsorption and shale inhibition are in Retz, et al., "An Environmentally Acceptable and Field-Practical, Cationic Polymer Mud System," SPE-23064 presented at the Offshore Europe Conference held in Aberdeen, Sep. 3–6, 1991, the subject matter of which is incorporated herein by reference.

Although research has identified cationic polymers which are effective shale inhibitors for use as drilling fluid additives, other cationic polymers with improved compatibility and low toxicity are desired.

A variety of fluids are used during and after drilling operations in subterranean earth formations. A clear distinction is drawn in the drilling fluids art between fluids that are actively used during drilling operations and fluids that are used after drilling operations. One type of fluid used after drilling operations is referred to as a fracturing fluid. Fracturing fluids are materials injected into the producing portion of a well formation in order to "fracture" the formation in which the hydrocarbons are maintained to permit ease of flow and ultimate removal. Such a fracturing fluid is taught by U.S. Pat. No. 5,097,904. Notably, the fracturing fluids typical in the oil well drilling industry do not include any of additives that are typically found in drilling fluids. In particular, drilling fluid characteristics such as toxicity and compatibility with anionic materials are not important to a fracturing fluid. Weight materials are not incorporated into fracturing fluids as they are in drilling fluids.

SUMMARY OF THE INVENTION

The present invention comprises drilling fluid additives for reducing the problems associated with clays which swell in the presence of water. A particular advantage of the additives of the present invention is their compatibility with common anionic drilling fluid components and their low toxicity.

Generally, the additives of one embodiment of the invention are mono (meric) quaternary alkylamines, which are the reaction products of (1) tertiary alkylamines of the following general formula:

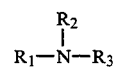

Wherein $R_1$ and $R_2$ can be methyl or hydroxy alkyl groups with 1–3 carbon atoms or a combination thereof, and $R_3$ is a hydroxy alkyl group with 1–3 carbon atoms; and (2) an alkyl halide of the following general formula:

Wherein R is an alkyl radical having up to four carbon atoms and X is a halogen selected from the group consisting of chlorine, bromine, and iodine.

The reaction products are believed to be quaternary alkyl amines having the following general structure:

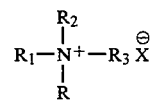

Wherein $R_1$, $R_2$, $R_3$, R and x are defined as above.

In another embodiment of this invention, the additive can be the polymerized product of a trihydroxyalkylamine reacted with an alkyl halide. The condensed polymerized product is believed to have the following general structure:

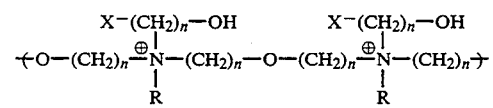

Wherein n=1–3, R is an alkyl radical having up to four carbon atoms and X is a halogen selected from the group including chlorine, bromine, iodine, or combinations thereof.

The condensed trihydroxyalkylamine polymer preferably has a molecular weight ranging from about 200 to about 15,000, with a preferred molecular weight range from about 350 to about 5,000. However, for practical purposes, the upper limit of the molecular weight is governed by maximum viscosities appropriate for manufacturing the condensed polyamine.

Furthermore, in another embodiment of this invention, the additive can be a reaction product of a trihydroxyalkylamine of the following general formula:

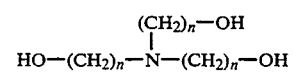

Wherein n=1–3 and a water soluble quaternary amine of the following general formula:

Q—X

Wherein Q is a water soluble quaternary amine and X is a halogen selected from the group consisting of chlorine, bromine, iodine, or combinations thereof. The reaction products are believed to have the following general structure:

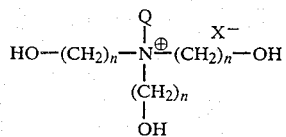

Wherein n, Q, and X are defined as above.

The drilling fluid additives of this invention have special utility in the drilling fluids art because they are both non-toxic and compatible with anionic drilling fluid components within commercially acceptable parameters. For purposes of this application, a compound should be understood to exhibit "low toxicity" when it possesses an $LC_{50}$ value of greater than 30,000 in the Mysid shrimp test prescribed by the U.S. Environmental Protection Agency for offshore drilling discharges. Likewise, a compound is considered compatible with anionic drilling fluid components when it fails to yield a precipitant in the presence of anionic polymers.

DETAILED DESCRIPTION OF THE INVENTION

The present invention comprises drilling fluid additives for reducing the downhole problems associated with clays which swell in the presence of water. A particular advantage of the additives of the present invention is their low toxicity and their compatibility with common anionic drilling fluid components.

Generally, the additives of the invention are monoquaternary hydroxyalkylalkylamines or poly (trihydroxyalkylalkylquaternary amines). Particularly preferred compounds of one embodiment of this invention are those which are the reaction product of a hydroxyalkyl tertiary amine and an alkyl halide obtained by reacting the compounds according to the following general reaction:

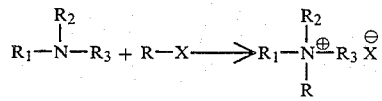

Wherein $R_1$ and $R_2$ are methyl or hydroxyalkyl groups with one to three carbon atoms or combinations thereof, $R_3$ is a hydroxyalkyl group with one to three carbon atoms, R is an alkyl radical with up to four carbon atoms and X is a halogen selected from the group consisting of chlorine, bromine, iodine, or combinations thereof.

Preferred tertiary hydroxyalkylamines are triethanolamine, diethanolmethylamine, dimethylethanolamine, and tripropanol-amine. Especially preferred resulting quaternary amines are the products resulting from the reaction of triethanolamine and methyl chloride, the product being quaternary triethanolaminemethyl chloride; and the reaction of dimethylethanolamine and methyl chloride, the product being quaternary trimethylethanolamine chloride, also commonly known as choline chloride. Choline chloride can also be made by reacting trimethylamine and chlorohydrin or ethylene oxide followed by neutralization with hydrochloric acid. The methods of synthesis are well known to those who are skilled in the art.

Another preferred embodiment of this invention is the reaction product of a trihydroxyalkylamine with another water soluble quaternary amine. These diquaternary amine products are obtained by reacting the compounds according to the following general reaction:

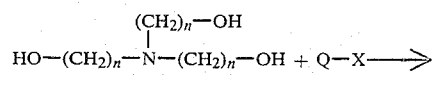

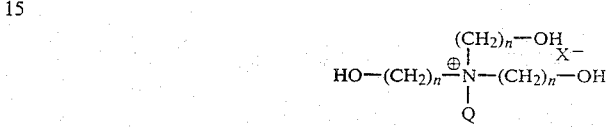

Wherein n=1–3, Q is water soluble quaternary amine and X is a halogen selected from the group consisting of chlorine, bromine, iodine, or combinations thereof.

For example, an effective diquaternary amine product results from reacting triethanolamine with water soluble quaternary amines. Especially preferred water soluble quaternary amines are those having the following general formula:

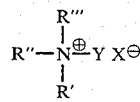

Wherein $R^I$, $R^{II}$, and $R^{III}$ are alkyl radicals having up to three carbon atoms and preferably one to two carbon atoms, Y is a hydroxy alkyl halide having up to four carbon atoms and X is a halogen selected from the group consisting of chlorine, bromine, iodine, or combinations thereof.

Yet, in another preferred embodiment of this invention, the additive can be the polymerized condensation product of a trihydroxyalkyl amine reacted with an alkyl halide. Such condensed product of a trihydroxyalkyl quaternary amine is believed to have the following general formula:

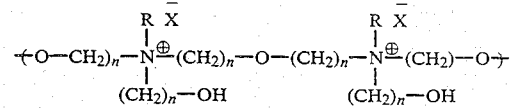

Wherein n=1–3, R is an alkyl radical having up to four carbon atoms and X is a halogen selected from the group consisting of chlorine, bromine, iodine, or combinations thereof.

The polymerized additives preferably have a molecular weight ranging from about 200 to about 15,000 with a preferred molecular weight ranging from about 350 to about 5,000; however, for practical purposes, the upper limit of the molecular weight is governed by maximum viscosities appropriate for manufacturing the condensed polymeric amine.

Quaternary amines are generically referred to as quaternary ammonium compounds. Specific information on the formulation and synthesis of quaternary amines and related materials is found in Kirk-Othmer, *Encyclopedia* of *Chemical Technology*, third edition, volume 19, pages 521-531. Additional information is found in L. D. Metcalfe, R. J. Martin, and A. A. Schmitz, *J. Am. Oil Chemical Society*, 43,355 (1966).

Quaternary ammonium compounds are tetrasubstituted ammonium salts. In all cases, the nitrogen atom is in the positively charged portion of the molecule.

The methods of preparation of quaternary ammonium compounds are many and varied, depending on the structure desired for the final compound. The most convenient reaction is one in which a suitable tertiary amine reacts with an alkylating agent, which can be an alkyl halide.

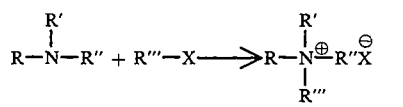

There are many variations in the final product because of the large number of diverse starting amines and alkylating agents.

Quaternary ammonium compounds are usually prepared in stainless steel or glass-lined equipment. The amine and solvent, e.g., isopropyl alcohol, water, or both, are loaded into the reactor and heated to the proper temperature (usually 80°-100° C.), and then the alkylating reagent is added. Quaternization of tertiary amines with alkyl halides is bimolecular. The rate of reaction is influenced by a number of factors, including basicity of the amine, steric effects, reactivity of the halide, and the polarity of the solvent. Polar solvents promote the reactions by stabilizing the ionic intermediates and products.

Methods of preparing quaternary amines are well known to those having ordinary skill in the art. In general, effective quaternary amines can be formed by heating the hydroxyalkylamine and alkyl halide, or other water soluble quaternary amine compound to temperatures up to about 120° C., preferably between about 65° C. and 120° C. The reactants are maintained at the desired temperature up to about 10 hours, and preferably from about 2 to about 10 hours, or until the reaction is completed. Generally, the reaction is complete when the tertiary amine value is approximately zero. This point can be determined by appropriate analytical techniques.

The polymerized additives are prepared generally by condensation polymerization. In a preferred method of preparing the polymerized additives, the trihydroxyalkylamine components are first condensed, and then the condensates are quaternized. Quaternization of the polymerized compounds is performed generally according to the procedure described above for the quaternization of the trihydroxyalkylamine.

In performing the condensation procedure, it is contemplated that several catalysts can be employed. Generally, performance and toxicity results indicate that base catalysts should be employed, as opposed to acid catalysts. Catalysts which are believed to be effective in preparing polymeric additives having low toxicity and compatibility with anionic drilling fluid additives include, but are not limited to, sodium hydroxide, calcium hydroxide, potassium hydroxide, and the like. Acid catalysts such as zinc chloride and calcium chloride do not appear to provide polymeric additives having the characteristics of low toxicity and compatibility. However, only routine screening is required to identify catalysts appropriate for use in preparing the polymerized additives of the present invention having the characteristics of both compatibility with anionic drilling fluid additives and low toxicity.

The additives of the present invention are added to a drilling fluid in concentrations sufficient to deal with the clay swelling problems at hand. Concentrations between about 0.5 pounds per barrel (ppb) and 10 ppb are generally contemplated and are considered to be functionally effective. However, in some situations, much higher concentrations might be desirable for controlling swelling clays in underground formations.

It is essential that the drilling fluid ultimately selected and formulated for use in any particular well application be appropriate for the conditions of the well. Therefore, although the base ingredients remain the same, i.e., salt or fresh water and the drilling fluid additives of this invention, other components can be added.

Specifically, materials generically referred to as gelling materials, thinners, fluid loss control agents, and weight materials are typically added to water base drilling fluid formulations. Of these additional materials, each can be added to the formulation in a concentration as rheologically and functionally required by drilling conditions. Typical gelling materials used in aqueous based drilling fluids are bentonite, sepiolite, and attapulgite clays and anionic high-molecular weight, water-soluble polymers such as partially hydrolyzed polyacrylamides.

An important aspect of the present invention is the presence of a weight material in the drilling fluid. Materials that have demonstrated utility as weight materials include Galena (PbS), Hematite ($Fe_2O_3$), Magnetite ($Fe_3O_4$), iron oxide ($Fe_2O_3$) (manufactured), Illmenite ($FeO.TiO_2$), Barite ($BASO_4$), Siderite ($FeCO_3$), Celestite ($SrSO_4$), Dolomite ($CaCO_3\ MgCO_3$), and Calcite ($CaCO_3$). The weight material is added to the drilling fluid in a functionally effective amount largely dependent on the nature of the formation being drilled. Weight materials are typically present only in drilling fluids and are not generally found in well treatment and stimulation fluids such as fracturing fluids. In fracturing fluids the use of weight materials is specifically avoided for functional reasons.

Similarly, it has been found beneficial to add lignosulfonates as thinners for water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and cake thickness, counteracting the effects of salts, minimizing the effects of water on the formations drilled, emulsifying oil in water, and stabilizing mud properties at elevated temperatures.

As mentioned previously, the drilling fluid composition of this invention contains a weight material. The quantity depends upon the desired density of the final composition. The most preferred weight materials include, but are not limited to, barite, hematite calcium carbonate, magnesium carbonate and the like.

Finally, anionic fluid loss control agents such as modified lignite, polymers, modified starches and modified celluloses can be added to the water base drilling fluid system of this invention.

As indicated, the additives of the invention are selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, etc.

Several preferred embodiments of the invention were prepared for use in the following examples. The several samples of condensates were prepared using various catalysts, as noted.

Triethanolaminemethyl chloride was prepared by mixing 60 grams of triethanolamine with 20 grams of distilled water. 20 grams of methyl chloride was then added to the solution. The solution was heated at about 65° C. for approximately 6 hours. Upon completion of the reaction the excess methyl chloride was evaporated. The reaction product is believed to be as follows:

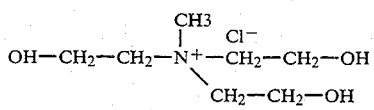

In an alternative embodiment, an improved drilling fluid additive was formed by reacting triethanolamine with N,N,N-trimethyl-2-hydroxy-3-chloropropane ammonium chloride to form a water soluble diquat. The reaction was conducted generally according to the procedure set forth above for the preparation of the triethanolaminemethyl chloride. The reactants have the following formulas:

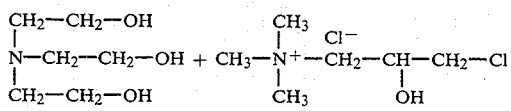

The resulting product is believed to have the following structure:

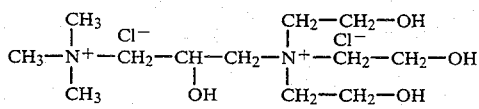

Condensates of triethanolamine were prepared using various catalysts, followed by quaternization of the condensates. In general, the condensate samples were prepared by mixing 200 grams of triethanolamine with 1 to 10% of the catalyst by weight. The catalysts employed in preparing the samples were sodium hydroxide, zinc chloride and calcium chloride.

Generally, the mixtures were heated between about 100° C. to about 250° C. for several hours until the desired condensation was achieved. The condensation water was distilled off during the reaction. The triethanolamine condensates were then quaternized according to the procedure set forth for the preparation of the triethanolaminemethyl chloride described above.

The following table summarizes the samples discussed in the following examples.

TABLE 1

| SAMPLE # | COMPOUND |
| --- | --- |
| 1 | Triethanolamine-methyl chloride |
| 2-7 | Triethanolamine- |

TABLE 1-continued

| SAMPLE # | COMPOUND |
| --- | --- |
|  | methyl chloride condensates |
| 8 | 2-hydroxy-N,N,N-tri-methyl-N',N',N'-tris(2-hydroxy-ethyl) 1,3-propane diammonium dichloride |
| 9 | hydroxyethyltrimethyl ammonium chloride (choline chloride) |

The following table summarizes the viscosities of the triethanolamine condensates and the catalysts used in the preparation of samples 2-7.

TABLE 2

| SAMPLE | VISCOSITY(CPS) | CATALYST |
| --- | --- | --- |
| 2 | 10,500 | NaOH |
| 3 | 20,000 | $CaCl_2$ |
| 4 | 12,500 | $ZnCl_2$ |
| 5 | 30,000 | $CaCl_2$ |
| 6 | 20,000 | NaOH |
| 7 | 80,000 | $CaCl_2$ |

The viscosities indicated in Table 2 are for the triethanolamine condensates prior to quaternization with methyl chloride.

The following examples are submitted for the purpose of illustrating the toxicity and performance characteristics of the present quaternized trihydroxyalkylamines and condensates thereof. The tests were conducted in accordance with the procedures in API Bulletin RP 13B-2, 1990. The following abbreviations are sometimes used in describing the results discussed in the examples:

"PV" is plastic viscosity which is one variable used in the calculation of viscosity characteristics of a drilling fluid.

"YP" is yield point which is another variable used in the calculation of viscosity characteristics of drilling fluids.

"GELS" is a measure of the suspending characteristics and the thixotropic properties of a drilling fluid.

"F/L" is API fluid loss and is a measure of fluid loss in milliliters of drilling fluid at 100 psi.

EXAMPLE 1

Test results indicate that significant reductions in clay swelling can be obtained by adding the trihydroxyalkyl quaternary amines of the present invention to drilling fluids. The following experiment shows the inhibition of bentonite clay. The reduction in yield point and viscosity indicates inhibition of the clay.

The experiment was carried out by adding 8 grams of the test sample to 330 ml of distilled water. 50 grams of API monogram bentonite clay were then added to the solution and the mixture was sheared for 30 minutes in a Hamilton Beach mixer and the rheology was measured with a viscosity meter according to the API procedure described above. The control contained only the bentonite clay and distilled water. The results are summarized below in Table 3.

TABLE 3

| | Rheology @ 75° F. | | |
|---|---|---|---|
| RPM | Sample 1 | Sample 6 | Control |
| 600 | 12 | 10 | 300 |
| 300 | 8 | 6 | 290 |
| 200 | 6 | 5 | — |
| 100 | 4 | 4 | — |
| 6 | 3 | 2 | — |
| 3 | 3 | 2 | — |
| PV/YP | 4/4 | 4/2 | 10/280 |

EXAMPLE 2

Samples of the additives of the present invention were also tested for compatibility with common anionic drilling fluid components. A 1-2% solution of anionic polymers (PAC LV—low viscosity sodium carboxymethylcellulose and PHPA—partially hydrolyzed polyacrylamide) were prepared in distilled water. 30 percent aqueous solutions of the samples of this invention were added to the polymer solutions. The precipitation of the anionic polymers from the solution indicated non-compatibility of the samples with anionic polymers. The results of the experiment are summarized in the following table.

TABLE 4

| SAMPLE | COMPATIBILITY (PAC LV) | COMPATIBILITY (PHPA) |
|---|---|---|
| 1 | YES | YES |
| 2 | YES | YES |
| 3 | NO | NO |
| 4 | NO | NO |
| 5 | NO | NO |
| 6 | YES | YES |
| 7 | NO | NO |
| 8 | YES | YES |
| 9 | YES | YES |

Note that samples 2 and 6, polymers condensed employing the sodium hydroxide catalyst, showed compatibility with anionic drilling fluid components. The acid catalyzed polymer samples 3, 4, 5, and 7 were incompatible with anionic components. Having identified this characteristic in the preparation of the polymers of the present invention, those with ordinary skill in the art can identify, by routine screening, other suitable catalysts which produce the condensed trihydroxyalkyl quaternary amines having the characteristic of compatibility with anionic polymers.

EXAMPLE 3

Testing was conducted to assess the toxicity levels associated with using samples 1-9 of the present invention. The United States Environmental Protection Agency has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis)" 1984 EPA-600/3-84-067, the subject matter of which is incorporated herein by reference.

For purposes of understanding the term "low toxicity" within the context of this application, the term refers to drilling fluid with an $LC_{50}$ of greater than 30,000 ppm by the Mysid shrimp test. Although 30,000 has been the number used for purposes of evaluation it should not be considered a limitation on the scope of this invention. Rather, the tests provide a context for the use of the term "low toxicity" as used in the present invention which will be readily understood by those with ordinary skill in the art. Other $LC_{50}$ values may be viable in various environmental settings. An $LC_{50}$ value of greater than 30,000 has been equated to an "environmentally compatible" product. Each sample was tested for toxicity at a concentration of 5 lbs/bbl in Generic Mud #7. The results of the 96 hour toxicity tests are provided below.

TABLE 5

| SAMPLE | $LC_{50}$ (96 HOURS) |
|---|---|
| 1 | >1,000,000 ppm |
| 2 | >1,000,000 ppm |
| 3 | <10,000 ppm |
| 4 | <10,000 ppm |
| 5 | <10,000 ppm |
| 6 | >1,000,000 ppm |
| 7 | <10,000 ppm |
| 8 | >1,000,000 ppm |
| 9 | >1,000,000 ppm |

The data in Tables 4 and 5 indicate that the samples which are compatible with anionic polymers are non-toxic while the compounds which are incompatible with anionic polymers are toxic.

EXAMPLE 4

Drilling fluids were prepared to test the effectiveness of the additives of the present invention in a simulated drilling fluid system. Drilling fluids were prepared using common drilling fluid additives and three tests were conducted.

Drilling fluid #1 contained 40 pounds per barrel bentonite clay in addition to other drilling fluid additives. After heat aging at 150° F., the viscosities were too high to measure, indicating an unusable drilling fluid due to hydration of the clays. Drilling fluid #2 had 33.8 pounds per barrel of potassium chloride and 10 pounds per barrel prehydrated bentonite. Even without extra bentonite, the rheologies were higher than for drilling fluid #3 which contained prehydrated bentonite as well as 40 pounds per barrel bentonite. The rheology tests for drilling fluid #3 indicate that the trihydroxyalkyl quaternary amines of the present invention prevented bentonite from swelling in a simulated drilling fluid system. The components of the three drilling fluids are provided below in Table 6.

TABLE 6

| Materials | Fluid 1 | Fluid 2 | Fluid 3 |
|---|---|---|---|
| 10 ppb Bentonite Slurry (prehydrated) | 152 ml | 152 ml | 152 ml |
| Seawater | 152 ml | 152 ml | 152 ml |
| Lube 167* | 7.0 ml | 7.0 ml | 7.0 ml |
| Sample 6 | — | — | 8.0 ml |
| PAC-LV** | 1.5 g | 1.5 g | 1.5 g |
| KCl | — | 33.8 g | — |
| Barite | 60 g | 60 g | 60 g |
| KOH | 0.75 g | 0.75 g | 0.75 g |
| Xanthan Gum | 0.5 g | 0.5 g | 0.5 g |
| Bentonite | 40 g | — | 40 g |

*Drilling Fluid Lubricant marketed by M-I.
**"AQUAFLO" from Aqualon Co. Aged 16 hours @ 150° F., Rolling Table 7 below summarizes the rheology tests for the three drilling fluids.

TABLE 7

| | Rheology | | |
|---|---|---|---|
| RPM | Fluid 1 | Fluid 2 | Fluid 3 |
| 600 | * | 50 | 43 |
| 300 | * | 34 | 24 |
| 200 | * | 27 | 17 |
| 100 | * | 19 | 9 |
| 6 | * | 6 | 2 |
| 3 | * | 5 | 1 |
| PV, CP | * | 16 | 19 |
| YP, LB/100 sq ft | * | 18 | 5 |
| GELS, lb/100 sq ft | * | 4/13 | 2/4 |
| pH | | 8.2 | 8.0 |
| API F/L, ml | | 10.4 | 8.8 |

* Viscosity too high to measure.

EXAMPLE 5

Drilling fluids were prepared to demonstrate the preparation of drilling fluid systems where the claimed inventions are used at high concentrations. The drilling fluids were prepared using common drilling fluid additives, which are previously described in this work. Table 8 lists the composition of Fluid A, which contains the claimed material choline chloride at a high concentration.

TABLE 8

| Composition of Fluid A | |
|---|---|
| Component | Quantity |
| Choline chloride (aq), 70% active | 246.4 ml |
| Barite | 200.0 g |
| Water | 60.0 ml |
| Xanthan gum biopolymer* | 0.4 g |
| PAC-LV** | 1.6 g |
| PHPA*** | 0.4 g |

*"XCD" supplied by KELCO-Rotary, Division of Merck
**"AQUAFLO" supplied by Aqualon Co.
***"AF-207" supplied by Hychem Co.

Fluid A was prepared in the following manner. A one pint jar containing water was placed under a shaft-driven mixer capable of variable speed mixing. At a good rate of stirring the xanthan gum biopolymer, PAC-LV, and PHPA were added to the water and stirred for a total of 30 minutes at room temperature. The jar was then removed from the mixer, sealed, and dynamically heat aged in an oven at 150° F. for 16 hours. After removal from the oven, the jar was placed under the mixer and the choline chloride (aq) was added while stirring at a good rate of shear, which continued for 15 minutes after the addition. The barite was added and the sample was stirred an additional 30 minutes to prepare a drilling fluid having a density of 12 pounds per gallon.

The data presented in Table 9 are for Fluid A, which was dynamically aged at 150° F. for 16 hours after its complete preparation. The rheologies of Fluid A were measured at 120° F. using a Model 35 Fann Viscometer.

TABLE 9

| Properties of Fluid A | |
|---|---|
| 600 rpm | 61 |
| 300 rpm | 34 |
| 200 rpm | 24 |
| 100 rpm | 14 |
| 6 rpm | 3 |
| 3 rpm | 2 |
| PV, CP | 27 |
| YP, lb/100 sq ft | 7 |
| 10 s Gel, lb/100 sq ft | 2 |

TABLE 9-continued

| Properties of Fluid A | |
|---|---|
| 10 min Gel, lb/100 sq ft | 4 |
| pH | 7.5 |
| API Fluid Loss, ml | 3.2 |

The data in Table 9 show that effective drilling fluids, which have the desirable properties of good rheological control and excellent fluid loss control by the use of readily available drilling fluid additives, are easily prepared with high concentrations of materials claimed in this work.

Although the preferred embodiment of this invention has been described in some detail, it should be appreciated that a variety of embodiments will be readily available to a person utilizing such drilling fluid additives for a specific end use. The description of the composition and method of this invention is not intended to be limiting on this invention, but is merely illustrative of the preferred embodiment of this invention. Other drilling fluid additives and methods of suppressing clay hydration which incorporate modifications or changes to that which has been described herein are equally included within this application.

What is claimed is:

1. A method of reducing the swelling of clay in a well comprising circulation in the well, a water-base fluid comprising a functionally effective concentration of the additive formed from the reaction of a trihydroxyalkylamine of the following general formula:

$$HO-(CH_2)_n-N\begin{matrix}(CH_2)_n-OH\\|\\\\\end{matrix}-(CH_2)_n-OH$$

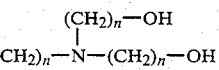

wherein, in n=1–3, with a water soluble quaternary amine compound of the following general formula:

$$Q-X$$

wherein, Q is a water soluble quaternary amine, and X is a halogen selected from the group consisting of chlorine, bromine, iodine, or combinations thereof, said reaction product being further characterized by (1) low toxicity as demonstrated by said reaction product having an $LC_{50}$, value of greater than 30,000 in the Mysid shrimp test as described in Duke, T. W., Parrish, P. R.; "*Acute Toxicity of Eight Laboratory Prepared Generic Drilling Fluids to Mysids (Mysidopsis)*" 1984 EPA-600/3-84-067, and (2) compatibility with anionic drilling fluid components, said compatibility being demonstrated by failure of said reaction product to yield a precipitant in the presence of anionic polymers.

2. The method of claim 1 wherein said trihydroxyalkylamine is selected from the group consisting of triethanolamine, trimethanolamine, and tripropanolamine.

3. The method of claim 1 wherein X is chlorine.

4. The method of claim 1 wherein said water soluble quaternary amine has the following general formula:

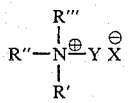

$$R''-\overset{R'''}{\underset{R'}{\overset{|}{N}^{\oplus}}}-Y\ X^{\ominus}$$

wherein $R^1$, $R^{11}$, $R^{111}$ are alkyl groups having up to 3 carbon atoms, Y is a hydroxyalkyl halide having up to four carbon atoms, and X is halogen selected from the group consisting of chlorine, bromine, iodine, and combinations thereof.

5. The method of claim 1 wherein the trihydroxyalkyl amine is selected from the group consisting of trimethanol amine, triethanol amine and tripropanol amine, and Q is a water soluble quaternary amine and X is chlorine.

6. The method of claim 1 wherein the said reaction product has the following general formula:

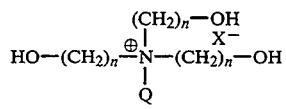

wherein, n=1-3, Q is a water soluble quaternary amine and X is a halogen selected from the group consisting of chlorine, bromine, iodine, or combinations thereof, said product being further characterized by (1) low toxicity as demonstrated by said reaction product having an $LC_{50}$, value of greater than 30,000 in the Mysid shrimp test as described in Duke, T. W., Parrish, P. R..; "*Acute Toxicity of Eight Laboratory Prepared Generic Drilling Fluids to Mysids (Mysidopsis)*" 1984 EPA-600/3-84-067, and (2) compatibility with anionic drilling fluid additive, said compatibility being demonstrated by failure of said reaction product to yield a precipitant in the presence of anionic polymers.

7. The method of reducing the swelling of clay in a well comprising circulating in the well a water-base fluid comprising a functionally effective concentration of polyquaternary amine additive formed from the condensed reaction product of a trihydroxyalkylamine of the following general formula:

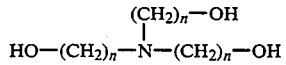

wherein, n=1-3, with an alkyl halide of the following general formula:

R—X wherein, R is an alkyl radical having up to four carbon atoms and X is a halogen selected from the group consisting of chlorine, bromine, iodine, or combinations thereof, said polyquaternary amine being further characterized by (1) low toxicity as demonstrated by said reaction product having an $LC_{50}$, value of greater than 30,000 in the Mysid shrimp test as described in Duke, T. W., Parrish, P. R.; "*Acute Toxicity of Eight Laboratory Prepared Generic Drilling Fluids to Mysids (Mysidopsis)*" 1984 EPA-600/3-84-067, and (2) compatibility with artionic drilling fluid components, said compatibility being demonstrated by failure of said reaction product to yield a precipitant in the presence of anionic polymers.

8. The method of claim 7 wherein the polyquaternary amine additive is a condensed product of a trihydroxyaikyl alkyl quaternary amine having the following general formula:

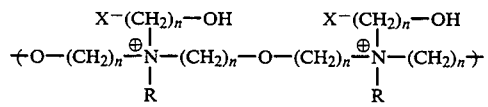

wherein, n=1-3, R is an alkyl group having up to four carbon atoms and X is halogen selected from the group consisting of chlorine, bromine, iodine, or combinations thereof.

9. The method of claim 7 wherein trihydroxyalkyl amine is selected from the group consisting of trimethanol amine, triethanol amine, and tripropanol amine, X is chlorine, and R is methyl.

10. The method of claim 7 wherein said polyquaternary amine additive is the condensed form of triethanolaminemethyl chloride.

* * * * *